United States Patent
Sims et al.

[11] Patent Number: 5,122,311
[45] Date of Patent: Jun. 16, 1992

[54] METHOD OF MANUFACTURE

[75] Inventors: Robert F. Sims, Billericay; Keith B. Lyons, Westgate, both of United Kingdom

[73] Assignee: Marconi Electronic Devices Limited, Lincoln, United Kingdom

[21] Appl. No.: 748,932

[22] Filed: Aug. 23, 1991

Related U.S. Application Data

[63] Continuation-in-part of Ser. No. 495,023, Mar. 16, 1990, abandoned.

[30] Foreign Application Priority Data

Mar. 12, 1990 [GB] United Kingdom ............... 9005508

[51] Int. Cl.⁵ .............................................. B29C 43/02
[52] U.S. Cl. ..................... 264/109; 264/125; 425/412
[58] Field of Search ............... 264/109, 118, 125; 425/78, 408, 411, 412; 419/65, 66, 68

[56] References Cited

U.S. PATENT DOCUMENTS

| | | | |
|---|---|---|---|
| 823,139 | 6/1906 | Schaaf | 425/411 |
| 3,048,537 | 8/1962 | Pall et al. | 264/112 |
| 3,439,081 | 4/1969 | Enderlein | 264/112 |
| 3,557,266 | 1/1971 | Chiba et al. | 264/125 |

FOREIGN PATENT DOCUMENTS

| | | |
|---|---|---|
| 807434 | 1/1959 | United Kingdom . |
| 1214285 | 12/1970 | United Kingdom . |
| 1278254 | 6/1972 | United Kingdom . |
| 1329676 | 9/1973 | United Kingdom . |
| 1459918 | 12/1976 | United Kingdom . |
| 2173443 | 10/1986 | United Kingdom . |

Primary Examiner—Mary Lynn Theisen
Attorney, Agent, or Firm—Spencer, Frank & Schneider

[57] ABSTRACT

In a method of manufacturing a member having a cross-sectional area which varies along its length, the member is produced by filling a cavity 6 in a die 5 with powdered material and compressing it. The die includes portions 8, 9 and 10 at different heights around the opening 7 so as to enable the amount of powdered present in the cavity to be varied along its length without compromising the shape of the final item to be manufactured.

8 Claims, 2 Drawing Sheets

METHOD OF MANUFACTURE

This application is a continuation-in-part of Ser. No. 07/495,023 filed Mar. 16th, 1990, now abandoned.

FIELD OF THE INVENTION

This invention relates to a method of manufacturing a solid member having a cross-section which varies in area along at least one dimension of the member.

BACKGROUND OF THE INVENTION

If it is wished to manufacture a member having a varying section, for example, a rod which is tapered at its ends, this may be machined from a solid piece of material. However, a number of operations may be required and it may prove difficult to obtain sufficient accuracy, especially where more complex shapes are required. Also, where the start material is in a powdered or granulate form, an additional manufacturing step is required to compress the material into a block prior to machining.

One technique which has previously been used to produce a shaped solid member from material in a powdered form involves filling of a flexible container with the material and subjecting it to isostatic pressure. However, such a technique requires relatively expensive equipment to carry it out and does not lend itself to large scale production.

SUMMARY OF THE INVENTION

The present invention arose from an attempt to provide an improved method for manufacturing shaped members and, in particular, ferrite devices suitable for use in Faraday rotators.

According to the invention there is provided a method of manufacturing a solid member of substantially uniform density from powdered material, which member has a cross-section which varies in area along at least one dimension of the member, including the steps of:

providing a die having a cavity therein, said cavity having a bottom surface and an upwardly facing opening extensive in the dimension in which the cross-sectional area of the solid member to be formed varies and a tool insertable through the opening in to the cavity to compress the powdered material, the tool including a tool surface which, together with the cavity, defines the shape of the solid member when the powdered material has been compressed;

said die having a non-uniform height surface around the opening, said non-uniform height surface including a portion which slopes with respect to another portion of said surface, said non-uniform height surface having a height relative to said bottom surface which is greater at those regions where the member is to be of greater cross-sectional area than a further height relative to said bottom surface at those regions where the member is to be of smaller cross-sectional area, the height and further height of the non-uniform height surface around the opening relative to the bottom surface at each region being selected according to the required compaction ratio of the powder material and according to the required shape of the solid member to be formed so that when the tool has compressed the powdered material, a solid member of substantially uniform density is thereby formed, the method comprising the further steps of;

filling the cavity with powdered material to the height of the non-uniform height surface around the opening;

and inserting the tool through the opening to compress the material in the cavity to form the solid member of substantially uniform density.

By employing the invention, a solid member of uniform density may be produced from powdered material which need not be machined after the compression step to get the desired configuration as it is to size. This method is therefore relatively inexpensive to implement and is particularly suited to high volume production of identical items.

The use of a method according to the invention ensures that there will be substantially the correct amount of powdered material in each region of the die so that when the material is compressed, the formed member has a substantially uniform density throughout its volume. If the opening to the cavity were uniform or level all the way round, the formed member would tend to have relatively hard and relatively softer regions. The applicant has appreciated that a powdered material need not be used so that its upper surface is horizontal, rather a powdered material can be placed flush in a die having an opening to a cavity which opening includes sloping portions, and that by selection of the height of the opening to the die at each region according to the required compaction ratio of the powdered material and the required shape of the member a solid member of uniform density having a non-uniform cross-section can be formed simply and reliably.

It may be preferred that, when the cavity is filled, excess powdered material is used, such that some spills onto the surrounding surface at the opening, and the excess is removed so as to leave the fill of powdered material in the cavity flush with the surface surrounding the opening. This ensures that each time the process is repeated, the same amount of powdered material is available in the die and hence the resulting products have substantially identical dimensions. It may be preferred that the excess be removed by brushing or scraping it away but other methods, for example, by removing it using a flow of air across the die, may be used.

Advantageously, the powder may include a binder in which case the step may be included of curing the binder after compression of the material.

The tool may be shaped so as to define, say, more than one surface of the member but it may be desirable to ensure that it only defines one surface. The other surfaces may then be configured according to the walls of the cavity.

Although the method in accordance with the invention may be used in the production of a number of types of devices, it is particularly applicable to the production of ferrite devices, in which case the powdered material includes a ferrite compound. Such devices may be used, for example, in polarisors used to rotate microwave radiation transmitted along a waveguide. It may be preferred to pre-sinter the powdered material prior to the step of filling the cavity to give a free flowing powder with some aggregation.

Where the member to be produced is a ferrite device, it may be in the form of an elongate rod having a rectangular cross-section along substantially its entire length, the rod having a central section of uniform cross-sectional area and end sections which are tapered. The rod may have a square cross section and is a particularly suitable shape for manufacture using the method in accordance with the invention.

BRIEF DESCRIPTION OF DRAWINGS

One way in which the invention may be performed is now described by way of example only with reference to the accompanying drawings in which.

DESCRIPTION OF PREFERRED EMBODIMENT

Figure 1:
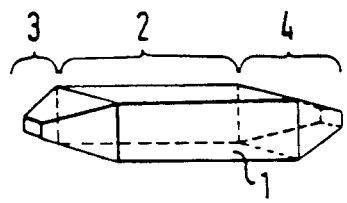
FIG. 1 illustrates the solid member to be manufactured.
Figure 2:
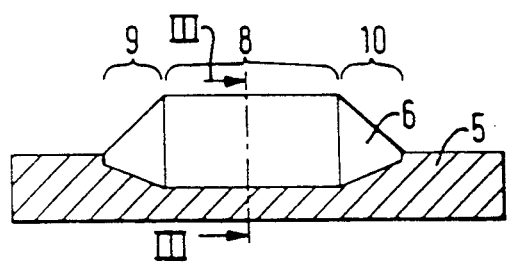
FIG. 2 is a longitudinal section through a die used in a method in accordance with the invention.
Figure 3:
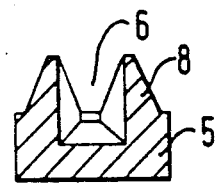
FIG. 3 is a transverse section of the die taken along the line III—III on FIG. 2.
Figure 4:
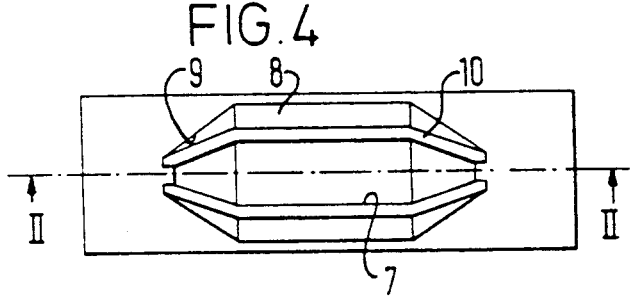
FIG. 4 is a plan view of the die shown in FIGS. 2 and 3.

A method in accordance with the invention is used to manufacture a ferrite spear 1, as shown in FIG. 1, which is an elongate member having a square cross-section. The central portion 2 of the spear 1 is of uniform cross-sectional area and the end portions 3 and 4 are pyramidal tapers having square end faces as shown. The die used in manufacturing the spear 1 is illustrated in FIGS. 2, 3 and 4. The die comprises a metal block 5 having a cavity 6 therein which is shaped so that its surfaces correspond to the side and bottom surfaces of the spear 1 as shown in FIG. 1. The surface of the die around the opening 7 of the cavity 6 is non-uniform, being of greater depth along a centre portion 8 and sloping downwardly, as shown, at end portions 9 and 10.

Figure 5:
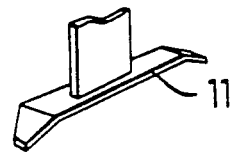
FIG. 5 schematically illustrates a tool used in the method.

FIG. 5 illustrates a tool 11 which defines the upper surface of the spear 1 when it is inserted into the cavity 6 through the opening 7.

Figure 6:
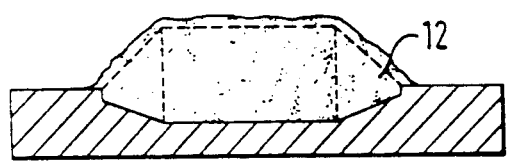
FIGS. 6, 7 and 8 illustrate steps of the method in accordance with the invention.

The initial step in carrying out the method in accordance with the invention is to fill the cavity 6 of the die 5 with a free-flowing powder which includes ferrite material mixed with lubricant and binder. Sufficient powder 12 is used to completely fill the cavity 6 and to spill over the edges of the opening onto the surrounding die surface, as shown in FIG. 6.

Figure 7:
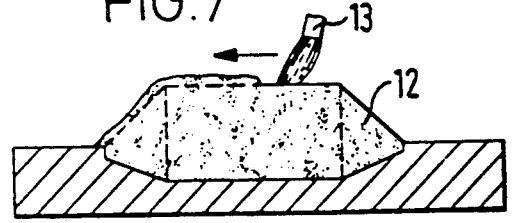
Figure 8:
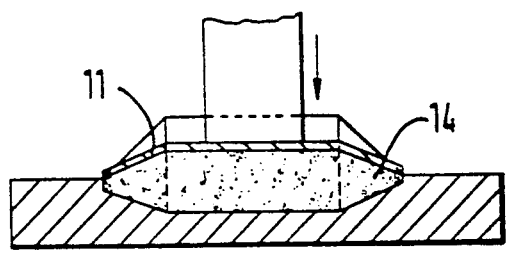

The powder 12 lying outside the cavity 6 is then removed by passing a brush 13 over the surface of the die as shown in FIG. 7. Then, as illustrated in FIG. 8, the tool 11 is inserted through the opening 7 and moved downwardly to compact the powder 12 into a solid member 14. The member 14 is then removed from the die 5 and heated to cure the binder.

The exact configuration of the surfaces around the opening in the die depends on the shape of the article to be produced in it and the compaction ratio, or compressibility of the powdered material. It should be noted, that in the case of a ferrite spear shown, the sloping parts 9 and 10 of the die do not correspond with the corresponding parts of the tool 11.

In order to obtain a member of uniform density which has a non-uniform cross-section it is first necessary to determine the required compaction ratio, i.e. the volumetric ratio between the uncompressed and compressed powder, or the ratio of fill depth to compacted thickness. The value of this ratio can be obtained by straightforward experimentation and will be dependent, amongst other factors, on the powder being used. Typically values lie in the range of between 2 and 2.5.

Figure 9:
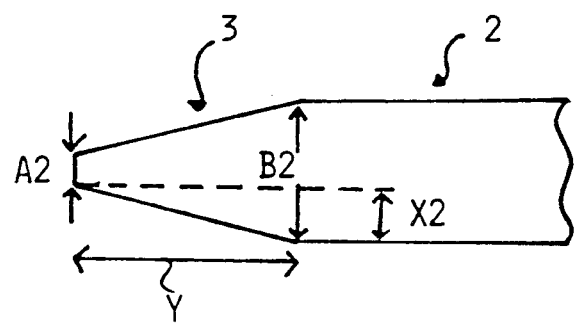
FIG. 9 is a side view of part of a formed member indicating the dimensions used to calculate the height of the die.
Figure 10:
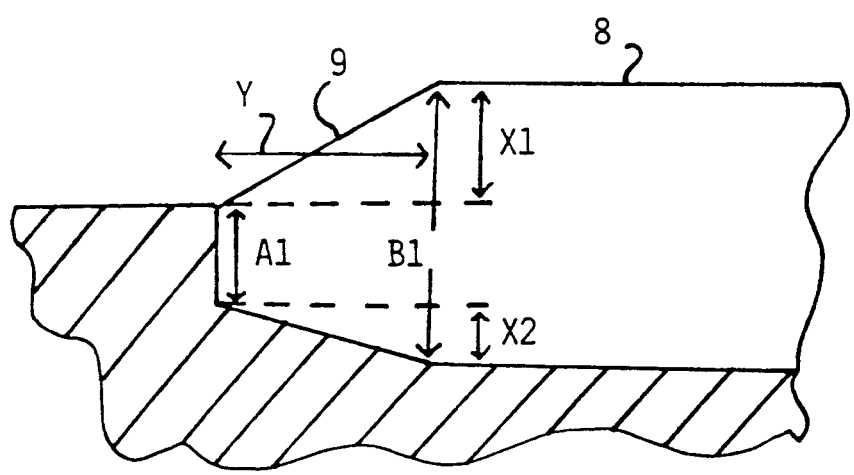
FIG. 10 is a partial longitudinal sectional view through the die indicating the dimensions of the die.

The way in which the height of the sloping parts 9 is calculated is described below, with reference to FIGS. 9 and 10.

The compaction ratio, $C = A1/A2 = B1/B2$
Die height, $X1 = B1 - A1 - X2$
Where $X2 = (B2 - A2)/2$
Therefore $X1 = C \times B2 - C \times A2 - (B2 - A2)/2$
$= C \times (B2 - A2) - (B2 - A2)/2$
$= (B2 - A2) \times (C - 0.5)$
Slope of portion $9 = X1/Y$ In an example, $B2 = 4.8$ m, $A2 = 1.2$ m and $C = 2.2$. Therefore the raised portion, X1, needs to be $(4.8 - 1.2) \times (2.2 - 0.5) = 6.1$ mm high.

It will be appreciated by those skilled in the art, that where the solid member to be formed is of a differing shape, e.g. includes curved portions, the regions of a suitable die corresponding to the sloping parts 9 need not be straight as shown but may be, e.g., curved. In such a case, an expression defining that shape may be developed using routine techniques.

What is claimed is:

1. A method of manufacturing a solid member of substantially uniform density from powdered material, which member has a cross-section which varies in area along at least one dimension of the member, including the steps of:

providing a die having a cavity therein, said cavity having a bottom surface and an upwardly facing opening extensive in the dimension in which the cross-sectional area of the solid member to be formed varies and a tool insertable through the opening into the cavity to compress the powdered material, the tool including a tool surface which, together with the cavity, defines the shape of the solid member when the powdered material has been compressed;

said die having a non-uniform height surface around the opening, said non-uniform height surface including a portion which slopes with respect to another portion of said surface, said non-uniform height surface having a height relative to said bottom surface which is greater at those regions where the member is to be of greater cross-sectional area than a further height relative to said bottom surface at those regions where the member is to be of smaller cross-sectional area, the height and further height of the non-uniform height surface around the opening relative to the bottom surface at each region being selected according to the required compaction ratio of the powder material and according to the required shape of the solid member to be formed so that when the tool has compressed the powdered material, a solid member of substantially uniform density is thereby formed, the method comprising the further steps of; filling the cavity with powdered material to the height of the non-uniform height surface around the opening;

and inserting the tool through the opening to compress the material in the cavity to form the solid member of substantially uniform density.

2. A method as claimed in claim 1, wherein, when the cavity is filled, excess powdered material is used such that some spills onto the surrounding surface, and including the step of removing the excess so as to leave the fill flush with the surface surrounding the opening prior to compression.

3. A method as claimed in claim 2, wherein the excess is removed by brushing or scraping it away.

4. A method as claimed in claim 1, wherein the powder includes a binder and including the step of curing the binder after compression of the material to form the solid member.

5. A method as claimed in claim 1, wherein the tool defines one surface only of the member.

6. A method as claimed in claim 1, wherein the powdered material includes a ferrite compound.

7. A method as claimed in claim 6 wherein the powdered material is pre-sintered prior to the step of filling the cavity.

8. A method as claimed in claim 6, wherein the member comprises an elongate rod having a rectangular cross-section along substantially its entire length, the rod having a central section of uniform cross-sectional area and end sections which are tapered.

* * * * *